3,518,162
NUCLEAR REACTOR CONTROL ELEMENT DRIVE APPARATUS
Harold V. Lichtenberger, West Simsbury, Conn., assignor to Combustion Engineering, Inc., Windsor, Conn., a corporation of Delaware
Filed Oct. 10, 1967, Ser. No. 674,206
Int. Cl. G21c 7/20
U.S. Cl. 176—36                                  6 Claims

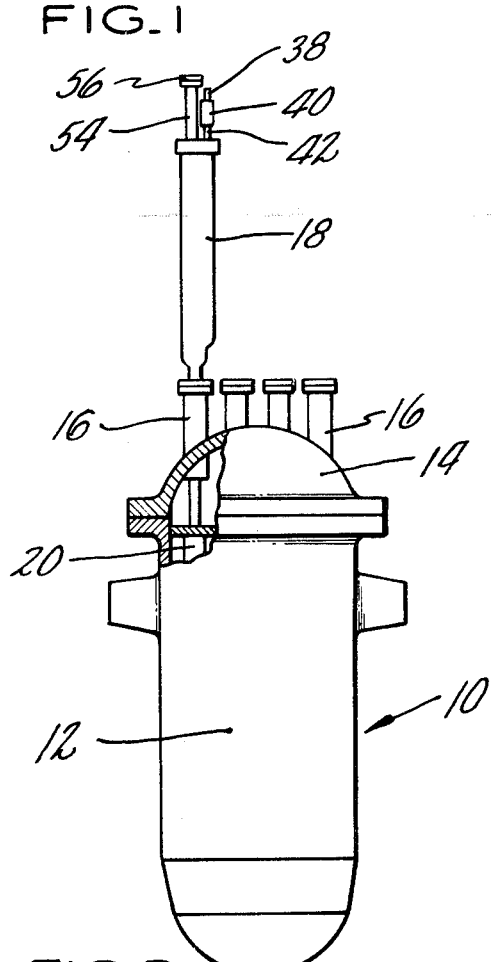
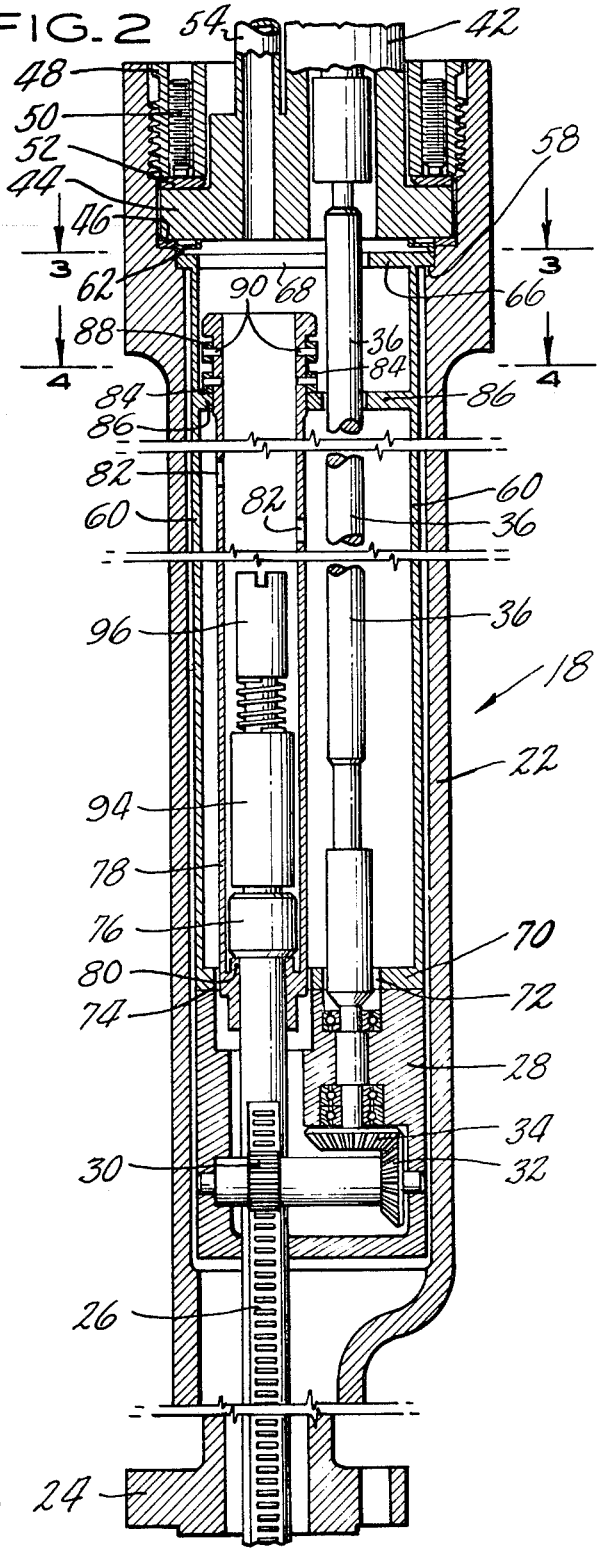
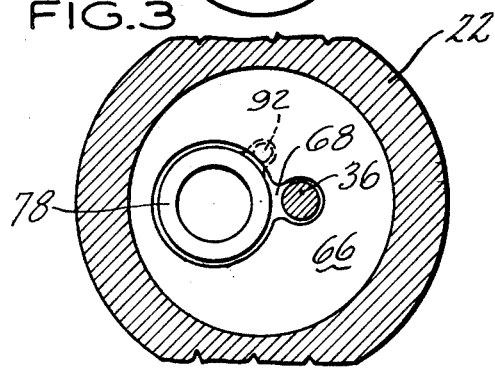
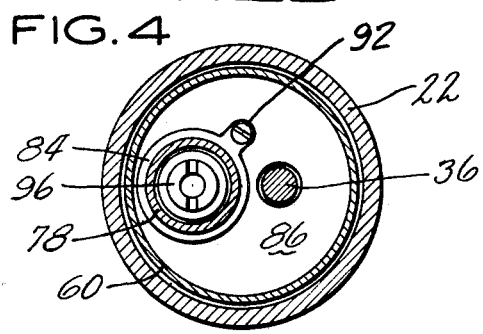
INVENTOR
HAROLD V. LICHTENBERGER
BY Richard H. Berneike
ATTORNEY United States Patent Office
3,518,162
Patented June 30, 1970

ABSTRACT OF THE DISCLOSURE

A rack and pinion nuclear reactor control element drive assembly with a piston and cylinder arrangement to guide the upper end of the rack and to control the rate of descent and deceleration of the control element during scram by means of reactor coolant liquid inlet and outlet openings in the cylinder. The cylinder is open at the top to permit access to means for uncoupling the control element assemblies from the drives.

BACKGROUND OF THE INVENTION

Control elements are provided for insertion into the cores of nuclear reactors to control and regulate the reactivity and power level of the reactor during operation. These control elements contain materials which absorb neutrons thereby lowering the neutron flux. In normal operation, the control elements are withdrawn at least partially from the core region and their position controlled to regulate the reactor. In the event of an emergency in which the reactor must be shutdown, it is necessary to rapidly insert control elements into the core. These emergency shutdown control elements may or may not be the same as the control elements used for normal regulation. This emergency procedure of inserting control elements is referred to as "scramming."

Control elements which enter the reactor core from the top and which are withdrawn from the core to a position thereabove can be scrammed by allowing the control elements to fall into the core by the force of gravity. This is normally accomplished by merely disconnecting the control elements from the drive. It is necessary, however, to provide means for controlling the rate of descent of the control elements and, more importantly, for gradually slowing down or decelerating the control elements just before they reach their extreme lower position to prevent damage to the reactor internals or to the control elements.

SUMMARY OF THE INVENTION

The present invention is therefore directed to a control element drive assembly for a nuclear reactor in which the control assemblies used for normal regulation are also used for emergency shutdown or scram. These drive assemblies incorporate means for controlling the rate of descent of the control elements and for gradually decelerating the elements to a stop in the lowered position. This is accomplished by a piston and cylinder arrangement wherein a piston, which is connected to the control element during scram is reciprocated within a cylinder which is filled with reactor coolant liquid. The rate of descent as well as the deceleration is controlled by the location, number and size of coolant liquid inlet and outlet openings in the cylinder. The cylinder and piston also act as a guide for the control element drive. A further feature of the invention involves means for absorbing the shock of the control element hitting bottom when there is no reactor coolant liquid in the cylinder to control the descent and deceleration. It is also an object of the invention to provide the above-mentioned piston and cylinder arrangement in conjunction with means for rapidly disconnecting the control elements from the drive assembly. The above features and objects of the invention will be more readily apparent from the following detailed description of an illustrative embodiment.

BRIEF DESCRIPTION OF THE DRAWING

FIG. 1 is an elevation view partially broken away illustrating a nuclear reactor incorporating the present invention;

FIG. 2 is a vertical cross section view illustrating a portion of the control element drive assembly; and FIGS. 3 and 4 are section views taken respectively along lines 3—3 and 4—4 of FIG. 2.

DESCRIPTION OF THE PREFERRED EMBODIMENT

Referring first to FIG. 1, there is illustrated a nuclear reactor 10 which includes a reactor vessel 12 and a vessel head 14. Extending upwardly from the vessel head 14 are a plurality of nozzles 16 on which are mounted the control element drive assemblies 18, only one of which is shown. The control elements (not shown) are contained within the shrouds 20 and are vertically movable into and out of the reactor core as is conventional.

Referring now to FIG. 2, there is illustrated in more detail a portion of a control element drive assembly 18. This assembly comprises a pressure housing 22 which is adapted to be mounted on top of a nozzle 16 by means of the flange 24 and suitably sealed thereto. The control elements are connected to and reciprocated by a rack and pinion drive assembly contained within the pressure housing 22. The rack 26 is mounted in a gear housing 28 for vertical movement within the pressure housing 22. The rack is driven by means of the pinion gear 30 and the bevel gears 32 and 34, which are also suitably mounted in the gear housing 28. A backup roller (not shown) is provided in the gear housing to hold the rack in proper engagement with the pinion gear. Attached to the bevel gear 34 is a drive shaft 36 which is connected to the drive motor 38 (shown in FIG. 1) through conventional clutch and braking means in the section 40. Pressure sealing means are provided around the drive shaft 36 in section 42 of the drive assembly since the pressure housing 22 is filled with reactor coolant and under reactor pressure.

Closing off and sealing the upper end of the pressure housing 22 is a closure plug 44 which forms a part of an autoclave type closure. This comprises a gasket 46 between the closure plug 44 and the pressure housing 22 and a housing ring 48 which is screwed into the pressure housing 22 over the closure plug 44. The screws 50 in the housing ring 48 are screwed down onto the washer 52 to force the closure plug 44 against the gasket 46 thus sealing the assembly. Extending upwardly from and forming a part of the closure plug 44 is a control element uncoupling access tube 54 through which uncoupling tools are inserted as will be explained hereinafter. The upper end of the access tube is sealed with a cover plate 56 as shown in FIG. 1. The drive shaft 36 for the rack and pinion drive extends through the plug 44 and is sealed thereto by the previously mentioned seal in section 42 of the plug 44.

Mounted within the pressure housing 22 and supported on the annular ledge 58 is a support tube 60. The support tube is maintained in position on the ledge 58 by means of the spring washer 62 which is forced downwardly against the support tube by the closure plug 44 to prevent vibration. This washer 62 is dog-legged or Z-shaped in cross section as illustrated in FIG. 2. The upper end of the support tube 60 is closed off by an end plate 66 which has an aperture 68 therethrough while the lower end of the support tube is closed off by end plate 70 with apertures 72 and 74 therein. The gear housing 28 is bolted to the lower end plate 70 and thus supported from the ledge 58 by means of the support tube 60.

Mounted on the upper end of the rack 26 is an enlarged cylindrical portion 76 which functions as a piston. This piston 76 runs in a guide tube or cylinder 78 thus providing lateral support for the upper end of the rack. The piston 76 and the guide tube 78 function as a piston and cylinder arrangement acting on the reactor coolant water which fills the guide tube. The piston 76 also acts to limit the downward travel of the rack by engaging the stop 80 at the bottom of the cylinder 78. This stop 80 is formed from a bushing inserted into the bottom of the cylinder and fastened thereto such as by welding or dowel pins.

The cylinder 78 has holes 82 therein suitably spaced throughout the length of the cylinder. These holes permit water to flow in and out of the cylinder 78 when the piston 70 is moved within the cylinder. The clearance between the piston 76 and the cylinder 78 and the size and location of the holes 82 are such that when the rack is released for a scram, the rack will descend at a controlled rate and be slowed to a gradual stop at the end of the stroke so as not to cause damage to any portion of the control elements or drive assembly. For example, with a guide tube cylinder 78 having an inside diameter of 2.510 inches and a piston 76 having a diameter of 2.486 inches, one-half inch holes may be located in the cylinder walls 18 and 20 inches up from the stop 80 and then every 8 inches up to about a foot from the top of the cylinder. Since there are no water outlet holes in the last 18 inches of travel, the water in the guide tube will slow down the piston 76 and act as a dashpot. During this latter portion of travel, the water will flow up around the piston 76 and down through the clearance between the rack 26 and the bushing in the lower end of the guide tube. The clearances between the drive shaft 36 and lower end plate 70 and between the guide tube 78 and lower end plate 70 must therefore be sized to permit water to flow back up to the upper portion of guide tube 78. The particular size, arrangement and number of water flow holes through the guide tube cylinder 78 may of course be varied and will depend primarily upon the weight of the control elements and rack as well as on the size of the guide tube cylinder and the piston clearance.

The guide tube cylinder 78 is supported within the support tube 60 by means of the ring or collar 84 which rests on the plate 86 which extends across the support tube 60 near the upper end. This collar 84 as well as the collar 88 is fastened to the guide tube 78 by means of shear pins 90. When the control rod drive mechanism is tripped for a scram, the control element assembly, the rack and the piston 70 drop under the force of gravity. In the event that such a trip occurs when there is no water in the guide tube cylinder 78, there will be no deceleration prior to the piston 76 hitting the stop 80. If this should happen, the force will be transferred through cylinder 78 to the collar 84 and the shear pins 90 in this collar. These pins 90 will shear and prevent damage to other portions of the drive mechanism or to the control elements. The collar 88 provides a backup shearing means in the event that the energy absorbed by the shearing of the pins in the collar 84 is insufficient to prevent damage to the apparatus.

The lower collar 84 which rests on the plate 86 is bolted thereto at 92 to hold the cylinder 78 in position and prevent it from "floating" up and down during operation. The lower end of the cylinder 78 fits into the opening 74 in the lower end plate 70 thus holding the end in position. Sufficient clearance is provided around the cylinder and in the gear housing 28 below the cylinder to permit the cylinder to move down in the event the pins 90 are sheared.

The upper end of the guide tube 72 is open to permit access to means for disconnecting the control elements from the rack and pinion drive means. This disconnecting means comprises the nut 94 and the nut turning and locking means 96. The nut 94 is screwed onto a rod or tube which extends down through the center of the rack 26 and which supports the control element clamping means (not shown). A tool is inserted through the access tube 54 down into the cylinder 78 and into engagement with the nut turning and locking means 96. The tool is then employed to operate the unlocking means and to turn the nut 94 to either engage or disengage the control elements. The operation of such control element support means and gripper operating means forms no part of the present invention and is more fully described in the U.S. patent applications of Gennaro V. Notari, entitled "Nuclear Reactor Control Element Gripper and Drive Apparatus," Ser. No. 674,205, filed Oct. 10, 1967, and Louis A. Bertone, entitled "Nuclear Reactor Control Rod Gripping Apparatus," Ser. No. 674,208, filed Oct. 10, 1967.

While a preferred embodiment of the invention has been shown and described, it is to be understood that such showing is merely illustrative and that changes may be made without departing from the spirit and scope of the invention as claimed.

I claim:

1. In a control element drive mechanism for a nuclear reactor cooled by a pressurized liquid coolant, a drive housing which contains said liquid coolant during reactor operation, a vertically extending control element drive member in said drive housing and extending downwardly therefrom, means for reciprocating said drive member, a cylindrical guide tube within said drive housing in line with said drive member, said guide tube containing liquid coolant during reactor operation, an opening through the bottom of said guide tube, said drive member extending up through said opening into said guide tube, a piston attached to the upper end of said drive member within said guide tube, the clearance between said piston and said guide tube being small so as to restrict the flow of liquid coolant past said piston, a stop at the bottom of said guide tube, said stop located in the path of travel of said piston to limit the downward travel of said piston and said drive means, supporting means attached to said drive housing, said supporting means having an opening therethrough, said guide tube extending through said opening in said supporting means, a supporting ring surrounding said guide tube above said supporting means and resting on said supporting means, said supporting ring retained on said guide tube but slideable with respect to said guide tube when excessive downward forces are placed on said guide tube.

2. Apparatus as recited in claim 1 and further including at least one coolant flow hole extending through the side of said guide tube and spaced a predetermined distance above said stop to permit coolant to flow out from said guide tube during a portion of the downward travel of said piston.

3. Apparatus as recited in claim 1 wherein said supporting ring is retained on said guide tube by means of shear pins extending from said supporting ring into said guide tube whereby said excessive downward forces on said guide tube will cause said shear pins to shear and permit said guide tube to move downwardly.

4. Apparatus as recited in claim 1 and further including additional supporting rings retained on said guide tube and located above said first supporting ring and spaced therefrom.

5. Apparatus as recited in claim 1 wherein the top of said guide tube is open and further including clamp operating means located within said guide tube above said piston rotatable with respect to said drive member and means permitting access through the said drive housing and into the top of said guide tube to operate said clamp operating means.

6. Apparatus as recited in claim 1 wherein said drive member is a rack and wherein said means for reciprocating said drive member includes a pinion gear.

(References on following page)

References Cited

UNITED STATES PATENTS

| | | | |
|---|---|---|---|
| 2,682,785 | 7/1954 | Cerutti et al. | 176—36 |
| 2,855,899 | 10/1958 | Beaty | 176—36 |
| 2,975,119 | 3/1961 | Emmons | 176—36 |
| 2,985,574 | 5/1961 | Newson et al. | 176—36 |
| 3,139,384 | 6/1964 | Filloleau et al. | 176—36 |
| 3,257,287 | 6/1966 | Good | 176—36 |

FOREIGN PATENTS

| | | |
|---|---|---|
| 239,921 | 1/1961 | Australia. |
| 1,451,407 | 7/1966 | France. |
| 860,691 | 2/1961 | Great Britain. |
| 886,317 | 1/1962 | Great Britain. |

CARL D. QUARFORTH, Primary Examiner

H. E. BEHREND, Assistant Examiner